United States Patent [19]
Ueda et al.

[11] Patent Number: 5,671,944
[45] Date of Patent: Sep. 30, 1997

[54] GAS GENERATOR FOR AIR BAG

[75] Inventors: Masayuki Ueda; Nobuyuki Katsuta, both of Hyogo, Japan

[73] Assignee: Daicel Chemical Industries, Ltd., Osaka, Japan

[21] Appl. No.: 736,286

[22] Filed: Oct. 24, 1996

[51] Int. Cl.$^6$ .................................................. B60R 21/26
[52] U.S. Cl. ........................... 280/737; 280/736; 280/741
[58] Field of Search .................................. 280/735, 736, 280/737, 741; 222/3, 5; 200/61.45; 422/165; 102/530, 531

[56] References Cited

U.S. PATENT DOCUMENTS

| | | | |
|---|---|---|---|
| 3,648,898 | 3/1972 | Day | 280/737 X |
| 5,189,255 | 2/1993 | Fukabori et al. | 280/741 |
| 5,201,542 | 4/1993 | Thuen et al. | 280/736 |
| 5,301,978 | 4/1994 | Munzel et al. | 280/737 |
| 5,313,879 | 5/1994 | Patel et al. | 280/736 X |
| 5,609,357 | 3/1997 | Amano | 280/734 |

FOREIGN PATENT DOCUMENTS 19541835  5/1996  Germany .

*Primary Examiner*—Christopher P. Ellis

[57] ABSTRACT

The present invention relates to a gas generator for an air bag having a structure in which a location relationship between percussion caps and piercing pins can be determined accurately and relative movements of both the above parts can be prevented. The gas generator which includes a housing, gas generation means disposed inside of the housing and ignition means for igniting the gas generation means is characterized in that the ignition means includes a mechanical sensor (5) having piercing pins, a cap piece (6) having hole portions (9) disposed to deviate from the central axis thereof in the radial direction, percussion caps (7) provided in the hole portions and forced to ignite by the piercing pins, and a transfer charge container (8), the mechanical sensor includes at least two positioning pins (15) provided on the end surface facing the cap piece and disposed to deviate from the central axis thereof in the radial direction, and the cap piece includes hole portions (17) for putting in the positioning pins.

1 Claim, 1 Drawing Sheet

PRIOR ART

GAS GENERATOR FOR AIR BAG

BACKGROUND OF THE INVENTION

1. Field of the Invention

The present invention relates to a gas generator for an air bag for protecting a driver or passengers from an impact occurring when a car crashes. More particularly, it relates to a gas generator having a mechanical sensor.

2. Related Art

As generally known, there are two types of gas generators, an electrical ignition type and a mechanical ignition type. The former is operative to actuate an igniter or squib to ignite a transfer charge as heat is generated by an electric current, while the latter is operative to actuate percussion caps with a full-mechanical sensor. The mechanical ignition type gas generator has the advantage of cutting costs in the manufacturing process due to no need of electric wiring.

FIG. 2 shows an example of a conventional mechanical ignition type gas generator. In FIG. 2, the gas generator is provided with a mechanical sensor 20 in a sensor housing 28. The mechanical sensor 20 includes piercing pins, not shown, inside thereof which are thrust out mechanically when sensing an impact occurring during a collision. Two percussion caps 21 are disposed on the top wall of the sensor housing 28 so as to deviate from the central axis 27 in the radial direction, respectively. The positions of the percussion caps 21 correspond to positions where the piercing pins are thrust out. The percussion caps 21 ignite as the piercing pins hit the percussion caps 21, so that a transfer charge 22 catches fire to ignite gas generants 23. This ignition causes the combustion of gas generants 23, resulting in generation of a gas. The gas generated is cooled during passing through a coolant 24, purified through a filter 25 and slows through an outlet port 26 into an air bag, not shown.

In such a conventional gas generator, if the piercing pins are not located in places exactly opposite to the percussion caps 21 at the stage of installing the mechanical sensor, the piercing pins will not hit the percussion caps 21, resulting in occurrence of an unexpected accident that the gas generator does not work.

Generally, it has taken a quite long time to accurately determine positioning between the piercing pins and the percussion caps. Even though the piercing pins and the percussion caps have been positioned accurately during assembly of the gas generator, they may deviate from each other as the mechanical sensor is moved by minor factors such as vibrations of a traveling car to which the gas generator has been attached.

SUMMARY OF THE INVENTION

Therefore, an object of the present invention is to provide a novel gas generator which can solve the above conventional problems.

The above object is accomplished, according to the present invention, by providing a gas generator for an air bag which includes a housing having gas outlet ports, gas generation means disposed inside of the housing and ignition means for igniting the gas generation means such that a gas generated in the gas generation means by an impact occurring when a car crashes is introduced into the air bag for protecting a driver or passengers of the car from the impact, characterized in that the ignition means includes a mechanical sensor having piercing pins, a cap piece disposed in close proximity to the mechanical sensor and having hole portions disposed to deviate from the central axis thereof in the radial direction, percussion caps put in the hole portions provided through the cap piece and forced to ignite by piercing pins and a transfer charge container disposed in close proximity to the cap piece for containing a transfer charge, the mechanical sensor includes at least two positioning pins provided on the end face contacting with the cap piece and disposed to deviate from the central axis thereof in the radial direction, and the cap piece includes hole portions for putting in the positioning pins.

In such a structure of the gas generator, the ignition means includes the mechanical sensor and the cap piece as mentioned above. The cap piece has the hole portions disposed to deviate from the central axis thereof in the radial direction for putting in the percussion caps, respectively.

The mechanical sensor includes at least two positioning pins also as mentioned above. The positioning pins are disposed to deviate from the central axis thereof in the radial direction, while the cap piece is provided with the hole portions for putting in the positioning pins, so that the positioning pins and the corresponding hole portions constitute positioning means. This positioning means accurately determine the location relationship between the percussion caps and the piercing pins and prevent the relative movements of both the above parts. The cap piece can be fixed to a wall portion of the housing and thereby the mechanical sensor is fixed to the housing through the cap piece.

The percussion caps supported by the cap piece are ignited by the piercing pins impacting thereon, thus igniting a transfer charge filled in the transfer charge container provided in close proximity to the cap piece.

BRIEF DESCRIPTION OF THE DRAWINGS

The invention will be described with reference to the accompanying drawings in which.

DETAILED DESCRIPTION

Hereinbelow, a preferred embodiment of the present invention will be described with reference to a drawing.

Figure 1:
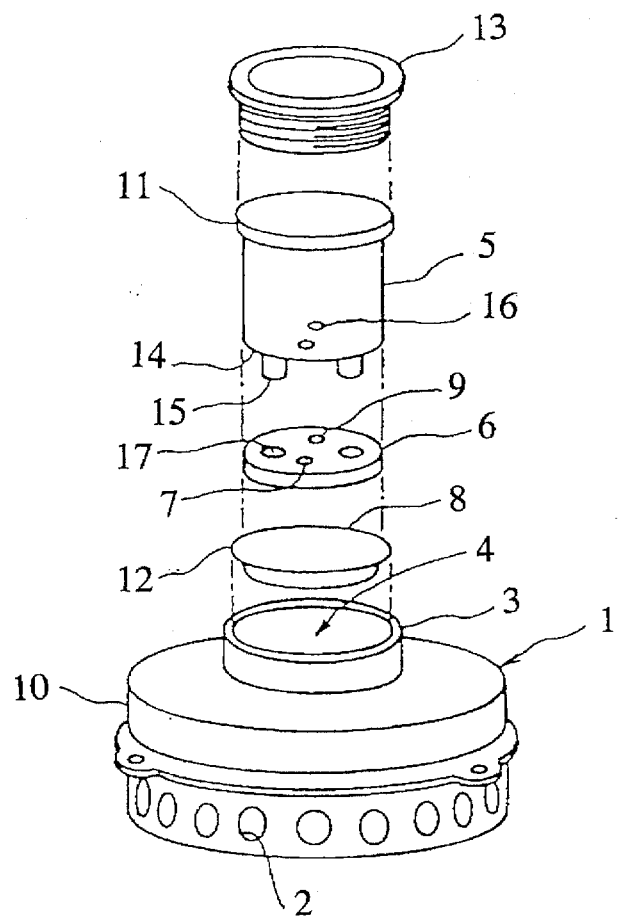
FIG. 1 is an exploded perspective view of a gas generator according to the present invention.

FIG. 1 is an exploded perspective view of a gas generator according to the present invention. In this gas generator, a housing 1 includes a plurality of gas outlet ports disposed on the circumferential face with a predetermined space. The housing 1 also includes a wall portion or centrally surrounding wall portion 3 of a cylindrical shape provided in the center thereof. The centrally surrounding wall portion 3 defines ignition means containing chamber 4 inside thereof. A combustion ring, not shown, is disposed between an outer wall portion 10 and the centrally surrounding wall portion 3, which defines a combustion chamber and a coolant/filter chamber respectively inside and outside thereof.

Gas generation means or a canister filled with gas generants is disposed inside of the combustion chamber, while a coolant and a filter are disposed inside of the coolant/filter chamber respectively for cooling and purifying the combustion gas.

Figure 2:
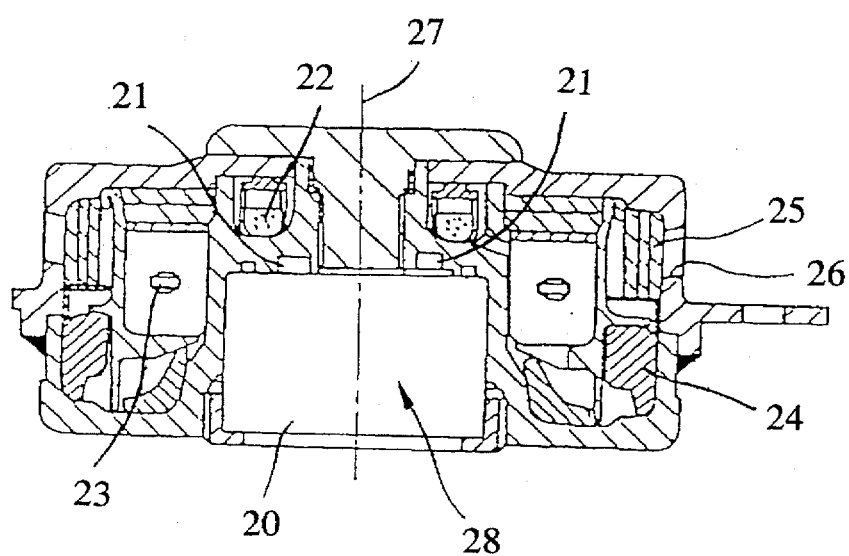
FIG. 2 is a cross-sectional view of a conventional gas generator.

Ignition means are disposed inside of the ignition means containing chamber 4, including a mechanical sensor 5, a cap piece 6, percussion caps 7 and a transfer charge container 8. The mechanical sensor 5 includes two piercing pins, not shown, inside thereof, which are thrust out mechanically when the mechanical sensor senses an impact occurring during a collision. The projecting positions of the piercing pins are designated by a reference numeral 16. The mechanical sensor 5 also includes a collar portion 11 formed around the circumference of one end thereof. The collar portion 11 has an outer diameter which is slidable in contact with the inner surface of the centrally surrounding wall portion 3. The centrally surrounding wall portion 3 thus controls the mechanical sensor 5 not to move in the radial direction. On the other hand, the cap piece 6 is a disc-type member having the same outer diameter as that of the mechanical sensor 5 and is disposed in close proximity to the mechanical sensor 5. The cap piece 6 includes two hole portions 9 disposed to deviate from the central axis in the radial direction, respectively. The positions of the hole portions 9 correspond to the projecting positions of the piercing pins. The percussion caps 7 are provided in the hole portions 9. As shown, the cap piece 6 is formed as a separate part, so that the percussion caps 7 can be charged more easily and safely than those of the conventional gas generator of FIG. 2. The cap piece 6 can be fixed to the centrally surrounding wall portion 3 of the housing 1 by proper fixation means, such as to use a set screw or press in the cap piece 6. The transfer charge container 8 is then disposed in close proximity to the cap piece 6. The transfer charge container 8 is a disc-type container with a collar portion 12 the inside of which is hollow for containing a transfer charge. The collar portion 12 has an outer diameter slightly smaller than the inner diameter of the centrally surrounding wall portion 3, so that the transfer charge container 8 is slidable in contact with the inner surface of the centrally surrounding wall portion 3 and is controlled not to move in the radial direction.

The mechanical sensor 5 further includes two positioning pins 15 disposed to deviate from the central axis in the radial direction, respectively. The positioning pins 15 are formed in places independently of the projecting positions 16 of the piercing pins. The height of the positioning pans 15 is then set to the thickness of the cap piece 6 or less. On the other hand, hole portions 17 are formed through the cap piece 6 so as to fit in the positioning pins 15. The hole portions 17 are disposed opposite to the positioning pins 15 so that the hole portions 9 can be located in places corresponding to the projecting positions 16 of the piercing pins.

During assembly, the transfer charge container 8, the cap piece 6 and the mechanical sensor 5 are assembled in this order and the assembled parts are then fixed to the inside of the ignition means containing chamber 4 by a rigid ring 13 being bolted to the outer end of the centrally surrounding well portion 3.

With such a structure discussed above, when the piercing pins of the mechanical sensor 5 are thrust out by a collision and thereby the percussion caps 7 are impacted, the percussion caps 7 catch fire so as to ignite the transfer charge. The ignition of the transfer charge causes the combustion of gas generants, resulting in generation of a gas. The gas generated is cooled and purified through the coolant and the filter and then it flows from the outlet ports 2 into the air bag.

Since the gas generator of the present invention has much a structure described above, the location relationship between the percussion caps and the piercing pins can be determined accurately and easily without any deviation from each other possibly occurring when the car is traveling. This makes it possible to secure the normal operation of the gas generator without fail.

What is claimed is:

1. A gas generator for an air bag which includes a housing having gas outlet ports, gas generation means disposed inside of the housing and ignition means for igniting the gas generation means, such that a gas generated in the gas generation means by an impact occurring when a car crashes is introduced into the air bag for protecting a driver or passengers of the car from the impact occurring during the collision, characterized in that said ignition means includes a mechanical sensor (5) having piercing pins, a cap piece (6) disposed in close proximity to said mechanical sensor and having hole portions (9) disposed to deviate from the central axis thereof in the radial direction, percussion caps (7) put in said hole portions of said cap piece and forced to ignite by said piercing pins, and a transfer charge container (8) disposed in close proximity said cap piece for containing a transfer charge, and said mechanical sensor includes at least TWO positioning pins (15) provided on the end surface facing said cap piece and disposed to deviate from the central axis thereof in the radial direction, while said cap piece includes hole portions (17) for putting in said positioning pins.

* * * * *

UNITED STATES PATENT AND TRADEMARK OFFICE
CERTIFICATE OF CORRECTION

PATENT NO : 5,671,944

DATED : September 30, 1997

INVENTOR(S) : UEDA et al.

It is certified that error appears in the above-identified patent and that said Letters Patent are hereby corrected as shown below:

On the title page, item

[57] ABSTRACT:

Line 10, change "to deviate" to --at positions deviating--;

Line 13 change "(8), the" to --(8). The--;

Line 15, change "to deviate" to --at positions deviating--;

Line 17, change "putting in" to --inserting--.

COL. 1:

Line 9, change "sensor." to --sensor for detecting a car crash.--;

Line 13, change "is operative to actuate" to --operates by actuating--;

Line 15, change "is operative to actuate" to --operates by actuating--;

Line 17, change "cutting" to --reducing--;

Line 18, change "due to no need of" to --because--;

Line 19, change "wiring." to --wiring is not required.--;

Line 26, change "the top" to --a top--;

Line 27, after " axis 27", insert --of the sensor housing 28--;

Line 35, change "slows" to --flows--;

Line 36, change "an outlet port" to --outlet ports--;

Line 39, change "at the stage of" to --when--;

Line 41, before "occurrence", insert --an--;

UNITED STATES PATENT AND TRADEMARK OFFICE
CERTIFICATE OF CORRECTION

PATENT NO : 5,671,944

DATED : September 30, 1997

INVENTOR(S) : UEDA et al.

It is certified that error appears in the above-identified patent and that said Letters Patent are hereby corrected as shown below:

Line 43, change "a quite long" to --quite a long--;

Line 44, after "determine", insert --the--;

Line 55, delete "conven-";

Line 56, delete "tional";

Line 60, after "housing", insert --,-- (comma);

COL. 2:

Line 28, after "by" insert --the--;

Line 13, change "disposed" to --deviating--;

Line 14, delete "to deviate";

Line 16, after "sensor", insert --also--;

Line 17, delete "also";

delete "are";

Line 18, delete "disposed to";

Line 23, change "determine" to --determines--;

Line 24, change "prevent" to --prevents--.

Line 48, after "ports", insert --2--;

Line 49, change "with" to --at--;

change "space." to --interval.--;

Line 63, change "means are" to --means,--;

UNITED STATES PATENT AND TRADEMARK OFFICE
CERTIFICATE OF CORRECTION

PATENT NO : 5,671,944
DATED : September 30, 1997
INVENTOR(S) : UEDA et al.

It is certified that error appears in the above-identified patent and that said Letters Patent are hereby corrected as shown below:

Line 64, change "including" to --includes--;

Line 65, after "7", insert --,-- (comma);

COL. 3:

Line 1, delete "occurring";

Line 13, delete "to";

Line 14, change "deviate" to --at positions deviating--;

after "axis", insert --of the cap piece 6--;

Line 22, change "to use" to --by using--;

Line 23, before "press", insert --a--;

Line 26, change "12 the" to --12. The--;

change "which" to --the container 8--;

Line 34, change "to deviate" to --at positions deviating--;

after "axis", insert --of the sensor 5--;

Line 37, change "pans" to --pins--;

Line 45, after "6", insert --,-- (comma);

COL. 4:

Line 3, change "being" to --which is--;

Line 4, change "well" to --wall--;

UNITED STATES PATENT AND TRADEMARK OFFICE
CERTIFICATE OF CORRECTION

PATENT NO : 5,671,944
DATED : September 30, 1997
INVENTOR(S) : UEDA et al.

It is certified that error appears in the above-identified patent and that said Letters Patent are hereby corrected as shown below:

Line 5, after "structure", insert --as--;

Line 12, change "it flows" to --flows out--;

Line 13, change "much" to --such--;

Line 14, after "structure", insert --as--;

Lines 16-17, change "deviation from each other possibly occurring" to --possibility of deviation therebetween due to vibrations--;

Line 18 change "secure" to --securely obtain--.

Line 21, change "air bag which includes" to --air bag, comprises";

Line 22, change "ports," to --ports;--;

Line 23, change "housing and" to --housing; and--;

Line 28, change "characterized in that" to --wherein--;

Line 29, delete "(5)";

Line 30, delete "(6)";

Line 32, delete "(9)";

change "to deviate" to --at positions deviating--;

Line 33, delete "(7)";

Line 36, delete "(8)";

after "proximity" insert --to--;

Line 39, delete "(15)";

UNITED STATES PATENT AND TRADEMARK OFFICE
CERTIFICATE OF CORRECTION

PATENT NO : 5,671,944

DATED : September 30, 1997

INVENTOR(S) : UEDA et al.

It is certified that error appears in the above-identified patent and that said Letters Patent are hereby corrected as shown below:

Line 40, change "to deviate" to --at positions deviating--;

Line 42, delete "(17)".

Signed and Sealed this

Twenty-fourth Day of November, 1998

*Attest:*

BRUCE LEHMAN

*Attesting Officer*     *Commissioner of Patents and Trademarks*